Figure 1:
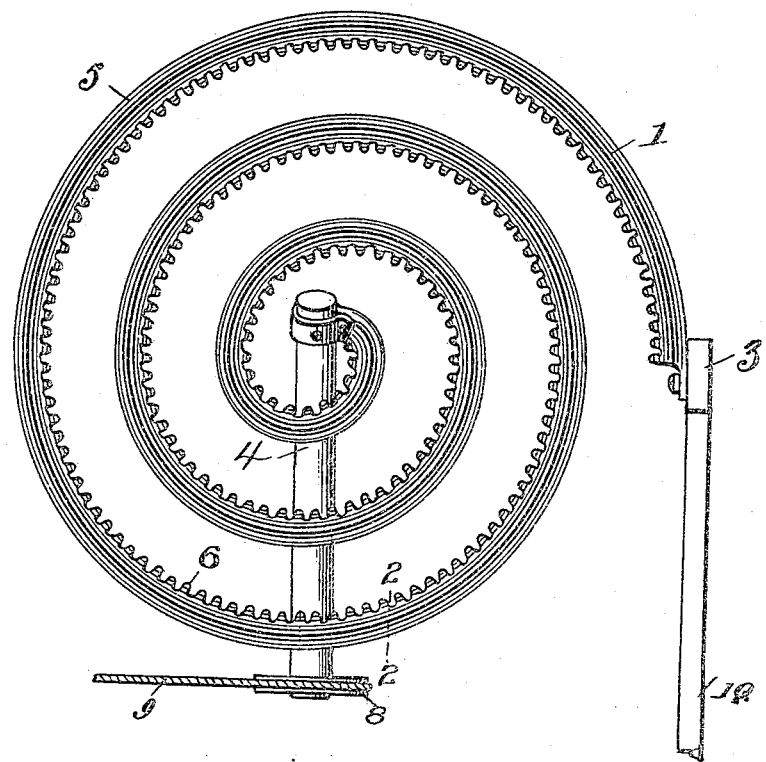

No. 792,588. PATENTED JUNE 20, 1905.
W. M. FULTON.
ATMOSPHERIC MOTOR.
APPLICATION FILED OCT. 28, 1901.

Witnesses
Chas. K. Davies.
Wm. B. Skeham.

Inventor
Weston M. Fulton
by
his Attorney

No. 792,588. Patented June 20, 1905.

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

ATMOSPHERIC MOTOR.

SPECIFICATION forming part of Letters Patent No. 792,588, dated June 20, 1905.

Application filed October 28, 1901. Serial No. 80,304.

*To all whom it may concern:*

Be it known that I, WESTON M. FULTON, a resident of Knoxville, Tennessee, have invented a new and useful Improvement in Atmospheric Motors, which invention is fully set forth in the following specification.

My invention relates to motors, and more particularly to motors designed to utilize changes in atmospheric pressure and temperature as a motive power.

In my application, Serial No. 48,003, filed February 19, 1901, I have described a motor of the character referred to in which the movements of a collapsible vessel containing a saturated vapor combined with a suitable gas are employed to impart motion to the motor, the amount of work performed by the motor being proportioned to the distance through which the collapsible portion of the vessel moves in the act of contraction or expanding under changes of atmospheric temperature and pressure. In the present invention one or more gases, as air and ammonia-gas, are placed in the collapsible vessel in the presence of a suitable liquid, as water, which absorbs a portion of the gas, and thereupon the atmospheric pressure causes the vessel to partially collapse. On the other hand, a rise in atmospheric temperature while the pressure remains constant will cause the liquid to give off the gases which had been absorbed and the vessel will be expanded. In like manner if the temperature should fall the liquid would reabsorb some of the gases and the vessel would contract. An increase in atmospheric pressure with constant temperature will cause some of the gases to be absorbed and the vessel will contract. A decrease in atmospheric pressure without change of temperature will cause some of the gases to be given off and the vessel will expand. Now I have discovered that if certain solids be placed in the liquid the amount of gas absorbed and given off as the result of variations of atmospheric pressure and temperature will be greatly increased and the effectiveness of the motor correspondingly enhanced. Of the solids which I have found useful for this purpose some dissolve in the liquid and form a true solution—as, for example, sodium chlorid, (NaCl,) cane-sugar, potassium acetate, ($KC_2O_2H_3$,) lithium chlorid, (LiCl,) potassium sulfocyanid, (KSCN,) ethyl salicylate, ($C_9H_{10}O_3$,) and naphthalene, ($C_{10}H_8$)—while others—as copper, iron, aluminium, platinum, glass, and zinc, which are not ordinarily regarded as soluble—are placed in the liquid in a pulverized or finely-divided state, and whichever class of solids be used or if some of one class and some of the other class be both used the result is as indicated above—viz., the increased facility in the absorption and emission of the gas under variations of atmospheric temperature and pressure. The gas may be and preferably is used in the presence of saturated vapors; but this is not necessarily done. I have further discovered that the use of solids of the above character and in the above manner in connection with volatile liquids and their vapors alone without a gas greatly facilitates the formation and condensation of the vapor under atmospheric changes, and thus enhance the motive power. For example, if one or more volatile liquids, as ether and benzene, be placed in the collapsible vessel and one or more solids, as sodium chlorid and zinc, be introduced the vessel will respond more readily to changes in atmospheric pressure and temperature. I have ascertained by experiment that it is not always necessary to place the solid in the liquid, since the solid by being suspended in the gas or vapor above the liquid will by coming into contact with these produce the desired effect. It is, however, usually most convenient to place the solid in the liquid.

From the foregoing it will be understood that the present invention relates to a device to be used in a motor of the character first referred to above and consists of a collapsible vessel containing a gas or gases in the presence of a liquid capable of absorbing and giving off the gas under variations of atmospheric pressure or temperature, said liquid preferably having a solid therein to facilitate the absorption and emission of the gas and the latter being used either with or without a saturated vapor. For example, if one or more solids be placed in one or more liquids, as naphthalene in a mixture of alcohol and water in the presence of a gas, as ammonia-gas, the vessel will be very sensitive to changes in atmospheric pressure and temperature and will show marked and frequent changes in volume.

While I prefer to employ a liquid and a solid in connection with a suitable gas—as ammonia, cyanogen, and oxygen, for example—I may and sometimes do employ the liquid and solid without the gas, and it will therefore be further understood that my present invention consists in the employment in a motor of the second type referred to above of a collapsible vessel containing one or more volatile liquids with their vapors, said liquid having a solid therein or in the vapor to facilitate the formation and condensation of the vapor.

I may employ any suitable collapsible vessel whose expansion and contraction may be converted into rotary motion, if desired, by any preferred mechanism—for example, such as shown in the application above referred to. For the purpose of illustrating the invention, however, I have shown it as used in a collapsible vessel of novel form and mode of application, which vessel is illustrated in the accompanying drawings, in which—

Figure 2:
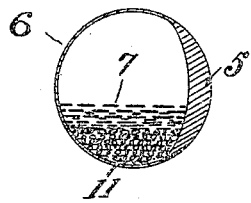

Figure 1 is a perspective view of the vessel, showing it attached to a shaft; and Fig. 2 is a transverse section through said vessel on the line 2 2.

Referring to the drawings, 1 is a tube coiled in a spiral and attached at one end by a bolt 3 to a stationary structure 10 and at the other end to a shaft 4, which may be the winding-shaft of a clock, for example, or supply power through a pulley 8 and cord 9 to any suitable device. This tube has a thickened wall 5 on its convex side, as it is coiled in the spiral, and a very thin wall 6 on its concave side, said wall 6 being preferably corrugated, as shown. Within the tube or vessel 1 is placed a suitable liquid 7, either with a solid in the liquid or suspended in the vessel and in the presence of a gas or gases or of vapors, as above described. Now suppose the temperature to rise, the pressure exerted upon the ends and walls of the tube by its interior contents will cause the inner corrugated portion to expand, while the outer thick portion will remain rigid. This will cause the tube to uncoil somewhat, and thereby rotate the shaft 4. A fall in temperature will evidently cause the shaft to rotate in the opposite direction. This motion of the shaft may be converted into direct rotary motion by any suitable method, and thus utilized for motive power. The inner end of the tube may be attached to a stationary fastening and the outer end attached to the rim of a wheel free to rotate upon an axis. The principle is evidently the same as that described above.

It will of course be understood that variations in atmospheric pressure, as well as variations in temperature, or variations of both pressure and temperature, will also cause the vessel to expand and contract and impart motion to the shaft.

This atmospheric motor is self-contained and does not depend upon any artificial variations of temperature to effect the expansion and contraction of its fluid or solid contents.

What is claimed is—

1. In an atmospheric motor, a collapsible and expansible vessel containing a gas and a liquid capable of absorbing and emitting the gas under variations of atmospheric pressure and temperature the quantity of fluid in said vessel remaining constant.

2. In an atmospheric motor, a collapsible and expansible vessel containing a gas and a liquid in which a solid has been placed to facilitate the absorption and emission of the gas under variations of atmospheric pressure and temperature, the quantity of fluid in said vessel remaining constant.

3. In an atmospheric motor, a collapsible and expansible vessel containing a gas, a vapor and a liquid in which a solid has been placed to facilitate the absorption and emission of the gas under variations of atmospheric pressure and temperature, the quantity of fluid in said vessel remaining constant.

4. In an atmospheric motor, a collapsible vessel containing a liquid with a soluble solid in solution, a saturated vapor and a gas.

5. In an atmospheric motor, a collapsible vessel containing water and alcohol with naphthalene dissolved therein, and a gas combined with the vapors of said water and alcohol.

6. In an atmospheric motor, a collapsible vessel containing water and alcohol with a solid dissolved therein, and ammonia-gas combined with the vapors of the water and alcohol.

7. In an atmospheric motor, a collapsible vessel containing alcohol, a soluble solid, a saturated vapor, and a gas.

8. In an atmospheric motor, a collapsible vessel containing water and alcohol, with naphthalene dissolved therein, and ammonia-gas combined with the vapors of the water and alcohol.

9. In a self-contained atmospheric motor, a collapsible vessel containing a gas a liquid and a solid capable of absorbing and emitting the gas under variations of atmospheric pressure and temperature.

10. In a self-contained atmospheric motor, a collapsible vessel containing a gas a liquid and a soluble solid, capable of absorbing and emitting the fluid under variations of atmospheric pressure and temperature.

11. In a self-contained atmospheric motor, a collapsible vessel containing a gas, a solid and a liquid capable of absorbing and emitting the gas under variations of atmospheric pressure and temperature.

12. In a self-contained atmospheric motor, a collapsible vessel containing a soluble solid, a gas and a liquid capable of absorbing and emitting the gas under variations of atmospheric pressure and temperature.

13. In a self-contained atmospheric motor, a collapsible vessel containing a solid, a vapor and a liquid capable of absorbing and emitting the vapor under variations of atmospheric pressure and temperature.

14. In a self-contained atmospheric motor, a collapsible vessel in the form of a spirally-coiled tube having a thickened wall on its convex side and a thin wall on its concave side, and having a thermal fluid therein.

15. In a self-contained atmospheric motor, a closed collapsible vessel in the form of a spirally-coiled tube having a thickened wall on its convex side and a thin corrugated wall on its concave side, and having a thermal fluid therein.

16. In an atmospheric motor, a collapsible vessel embodying a coiled tube having a thickened wall on one side and a thin wall on the other, and containing a fluid and a liquid capable of absorbing and emitting said fluid under variations of atmospheric pressure and temperature.

17. In an atmospheric motor, a collapsible vessel embodying a coiled tube having a thickened wall on one side and a thin corrugated wall on the other, and containing a fluid and a liquid capable of absorbing and emitting said fluid under variations of atmospheric pressure and temperature, and a solid.

18. In an atmospheric motor, a collapsible vessel embodying a coiled tube having a thickened wall on one side and a thin corrugated wall on the other, and containing a gas and a liquid capable of absorbing and emitting said gas under variations of atmospheric pressure and temperature.

19. In an atmospheric motor, a collapsible vessel embodying a coiled tube having a thickened wall on one side and a thin corrugated wall on the other, and containing a gas, a solid and a liquid capable of absorbing and emitting said gas under variations of atmospheric pressure and temperature.

20. In an atmospheric motor, a collapsible vessel embodying a coiled tube having a thickened wall on one side and a thin corrugated wall on the other, and containing a liquid and a solid capable of absorbing and emitting a gas under variations of atmospheric pressure and temperature.

21. In an atmospheric motor, a collapsible vessel embodying a coiled tube having a thickened wall on one side and a thin corrugated wall on the other, and containing a gas, a liquid and a solid capable of absorbing and emitting the gas under variations of atmospheric pressure and temperature.

22. In an atmospheric motor, a collapsible vessel embodying a coiled tube having a thickened wall on one side and a thin corrugated wall on the other, and containing a volatile liquid and a solid, whereby the said vessel is rendered more sensitive to variations of atmospheric pressure and temperature.

23. In an atmospheric motor, a collapsible vessel embodying a coiled tube having a thickened wall on one side and a thin corrugated wall on the other, and containing a gaseous body, a liquid, and a solid, whereby the said vessel is rendered more sensitive to variations of atmospheric pressure and temperature.

In testimony whereof I have signed this specification in the presence of two subscribing witnesses.

WESTON M. FULTON.

Witnesses:
L. M. GROSS,
M. E. CRAWFORD.